United States Patent
Wu (10) Patent No.: US 10,448,447 B2
(45) Date of Patent: Oct. 15, 2019

(54) DEVICE AND METHOD FOR HANDLING A BEARER TYPE CHANGE FOR A RADIO BEARER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/103,923

(22) Filed: Aug. 14, 2018

(65) Prior Publication Data
US 2019/0059124 A1      Feb. 21, 2019

Related U.S. Application Data

(60) Provisional application No. 62/547,085, filed on Aug. 17, 2017, provisional application No. 62/547,079, filed on Aug. 17, 2017, provisional application No. 62/566,331, filed on Sep. 30, 2017, provisional application No. 62/566,332, filed on Sep. 30, 2017.

(51) Int. Cl.
| H04W 76/15 | (2018.01) |
| H04W 80/08 | (2009.01) |
| H04W 76/27 | (2018.01) |
| H04W 28/06 | (2009.01) |

(52) U.S. Cl.
CPC ......... H04W 76/15 (2018.02); H04W 28/065 (2013.01); H04W 76/27 (2018.02); H04W 80/08 (2013.01)

(58) Field of Classification Search
CPC ... H04W 76/15; H04W 76/27; H04W 28/065; H04W 80/08
See application file for complete search history.

(56) References Cited

U.S. PATENT DOCUMENTS

2017/0006484 A1* 1/2017 Lee ..................... H04W 76/10

FOREIGN PATENT DOCUMENTS

EP    2 835 925 A1    2/2015

OTHER PUBLICATIONS

3GPP TS 37.340 V0.2.1 (Aug. 2017).
3GPP TS 37.340 V0.2.0(Jun. 2017), "3rd Generation Partnership Project; Technical Specification Group Radio Access Network; Evolved Universal Terrestrial Radio Access (E-UTRA) and NR; Multi-connectivity; Stage 2 (Release 15)", pp. 1-43.
(Continued)

Primary Examiner — Duc C Ho
(74) Attorney, Agent, or Firm — Winston Hsu (57) ABSTRACT

A method for handling a bearer type change comprises receiving a first RRC message from a first BS; transmitting a first RRC response message to the first BS; establishing a first PDCP entity; transmitting a first plurality of PDCP SDUs to a second BS according to the first PDCP entity; receiving a second RRC message from the first BS, wherein the second message configures the DRB from the SCG bearer type or the split bearer type to a MCG bearer type; transmitting a second RRC response message to the first BS; releasing the first PDCP entity, and establishing a second PDCP entity; and transmitting a second plurality of PDCP SDUs to the first BS according to the second PDCP entity.

10 Claims, 7 Drawing Sheets

(56) References Cited

OTHER PUBLICATIONS

3GPP TS 38.323 V0.1.0, Jun. 2017,"3rd Generation Partnership Project; Technical Specification Group Radio Access Network; NR; Packet Data Convergence Protocol (PDCP) specification (Release 15)," pp. 1-28.

Ericsson, PDCP lossless SN reconfiguration, 3GPP TSG-RAN WG2 AH NR#2 (R1-1707152), Jun. 27-29, 2017, Qingdao, P.R. of China, pp. 1-5.

Ericsson, PDCP reception algorithm, 3GPP TSG-RAN WG2 #98-AH (Tdoc R2-1707154), Qingdao, P.R. of China, Jun. 27-29, 2017, pp. 1-6.

Huawei(rapporteur), Summary of [97bis#12][NR]Bearer type change(Huawei), 3GPP TSG-RAN WG2 NR Adhoc#2, (R2-1707403), Qingdao, China, Jun. 27-29, 2017, pp. 1-27.

Office action dated Apr. 16, 2019 for the Taiwan application No. 107128697, filing date Aug. 17, 2018, pp. 1-15.

\* cited by examiner

DEVICE AND METHOD FOR HANDLING A BEARER TYPE CHANGE FOR A RADIO BEARER

CROSS REFERENCE TO RELATED APPLICATIONS

This application claims the benefits of U.S. Provisional Applications No. 62/547,085 filed on Aug. 17, 2017, No. 62/547,079 filed on Aug. 17, 2017, No. 62/566,331 filed on Sep. 30, 2017 and No. 62/566,332 filed on Sep. 30, 2017, which are incorporated herein by reference.

BACKGROUND OF THE INVENTION

1. Field of the Invention

The present invention relates to a device and a method used in a wireless communication system, and more particularly, to a device and a method of handling a bearer type change for a radio bearer.

2. Description of the Prior Art

When a handover from a new radio (NR) to a long-term evolution (LTE) is initiated, the bearer type of a radio bearer changes accordingly. However, how the packet data convergence protocol (PDCP) keeps the operations (e.g., transmissions or receptions) after the change of the bearer type is still unknown.

SUMMARY OF THE INVENTION

The present invention therefore provides a communication device for handling a bearer type change for a radio bearer to solve the abovementioned problem.

A method for handling a bearer type change for a radio bearer comprises receiving a first radio resource control (RRC) message on a signaling radio bearer (SRB) from a first base station (BS), wherein the first RRC message configures a data radio bearer (DRB) which is a secondary cell group (SCG) bearer type or a split bearer type, and configures a first packet data convergence protocol (PDCP) configuration for the DRB; transmitting a first RRC response message to the first BS on the SRB, in response to the first RRC message; establishing a first PDCP entity for the DRB according to the first PDCP configuration; transmitting a first plurality of PDCP Service Data Units (SDUs) to a second BS according to the first PDCP entity and a TX_NEXT associated to the first PDCP entity; receiving a second RRC message on the SRB from the first BS, wherein the second message configures the DRB from the SCG bearer type or the split bearer type to a master cell group (MCG) bearer type, and configures a second PDCP configuration for the DRB; transmitting a second RRC response message on the SRB to the first BS, in response to the second RRC message; releasing the first PDCP entity and establishing a second PDCP entity according to the second PDCP configuration; and transmitting a second plurality of PDCP SDUs to the first BS according to the second PDCP entity and a TX_HFN and a Next_PDCP_TX_SN associated to the second PDCP entity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
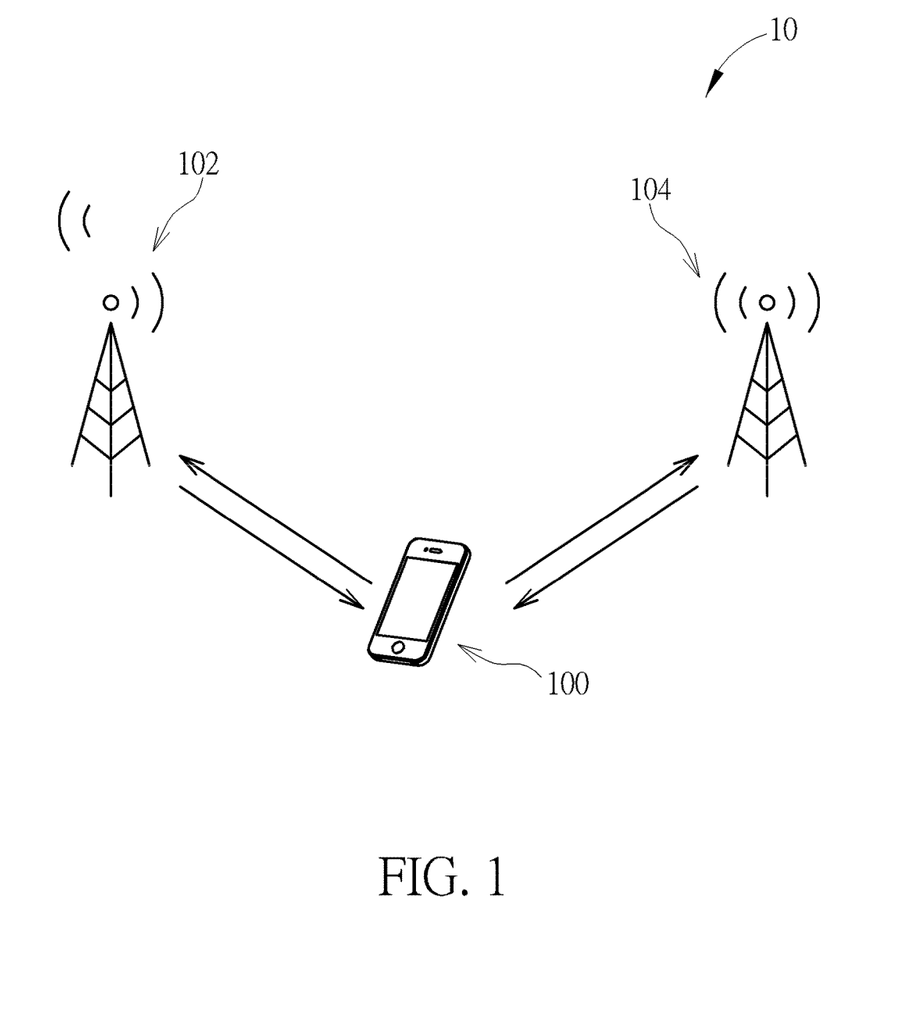
FIG. 1 is a schematic diagram of a wireless communication system according to an example of the present invention.

In FIG. 1, the wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). For example, the communication device 100 in the DC receives packets from the BS 102 at a first carrier frequency and the BS 104 at a second carrier frequency, or the communication device 100 in the DC transmits packets to the BS 102 at a first carrier frequency and/or the BS 104 at a second carrier frequency. In addition, one of the BSs 102 and 104 may be a master node (MN) and the other BS may be a secondary node. The first carrier and the second carrier frequency may or may not be overlapped.

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
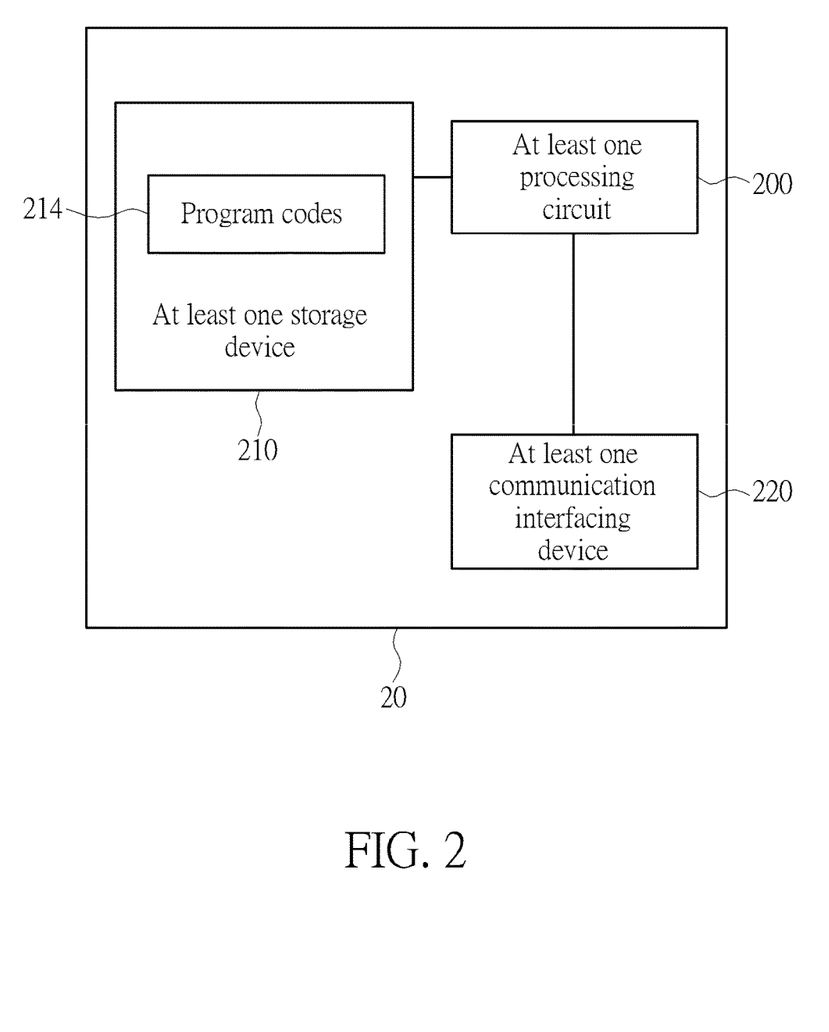
FIG. 2 is a schematic diagram of a communication device according to an example of the present invention.

In FIG. 2, the communication device 20 may be the communication device 100, the BS (s) 102 and/or 104 shown in FIG. 1, but is not limited herein. The communication device 20 includes at least one processing circuit 200 such as a microprocessor or Application Specific Integrated Circuit (ASIC), at least one storage device 210 and at least one communication interfacing device 220. The at least one storage device 210 may be any data storage device that stores program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

A protocol architecture is used for illustrating that the use of a radio bearer (RB) depends on how the RB is established. A RB may be a data RB (DRB) for a user plane data transmission or reception, and a signaling RB (SRB) for a control plane data transmission or reception. A DRB configuration comprises at least one of a DRB identity, a packet data convergence protocol (PDCP) configuration, a radio link control (RLC) configuration, a logical channel identity and a logical channel configuration (e.g., priority or logical channel group). A SRB configuration comprises a SRB identity, the RLC configuration and the logical channel configuration. In the dual connectivity (DC), there may be three types of RB: a master cell group (MCG) bearer, a secondary cell group (SCG) bearer and a split bearer. The MCG bearer utilizes radio protocols located at the MN, to use the MN radio resources (i.e., time and frequency resources). The SCG bearer utilizes radio protocols located at the secondary node, to use the secondary node radio resources. The split bearer may utilize protocols located at both the MN and the secondary node, to use both the MN resources and the secondary node resources. The split bearer is a MCG split bearer or a SCG split bearer. A DRB is the MCG bearer, the SCG bearer or the split bearer. A SRB is configured as the MCG bearer or the split bearer.

In one example, a communicate device (e.g., the communication device 100 or the BS(s) 102/104) may use the following state variables to communicate PDCP Service Data Units (SDUs) associated to a RB with another communication device (e.g., the communication device 100 or the BS(s) 102/104).

TX_NEXT, which indicates a COUNT value of a next PDCP SDU to be transmitted and is used by a PDCP entity. At establishment of the PDCP entity, the TX_NEXT is set to an initial value (e.g., 0).

RX_NEXT, which indicates a COUNT value of a next PDCP SDU expected to be received and is used by the PDCP entity. At establishment of the PDCP entity, the RX_NEXT is set to an initial value (e.g., 0).

RX_DELIV, which indicates a COUNT value of a first PDCP SDU not delivered to upper layers and is used by the PDCP entity, but still waited for. At establishment of the PDCP entity, the RX_DELIV is set to an initial value (e.g., 0).

RX_REORD, which indicates a COUNT value following a COUNT value associated with a PDCP Data PDU which triggers/triggered t-Reordering to be started or restarted, and is used by the PDCP entity.

In another example, a communicate device (e.g., the communication device 100 or the BS(s) 102/104) may use the following state variables to communicate PDCP SDUs associated to a RB with another communication device (e.g., the communication device 100 or the BS(s) 102/104).

Next_PDCP_TX_SN, which indicates a PDCP sequence number (SN) of the next PDCP SDU to be transmitted by a PDCP entity. At establishment of the first PDCP entity, the Next_PDCP_TX_SN is set to an initial value (e.g., 0).

TX_HFN, which indicates a hyper frame number (HFN) value for the generation of a COUNT value used for the next PDCP SDU to be transmitted by the PDCP entity. At establishment of the first PDCP entity, the TX_HFN is set to an initial value (e.g., 0).

Next_PDCP_RX_SN, which indicates the next expected PDCP SN to be received by a PDCP entity associated to the RB. At establishment of the PDCP entity, the Next_PDCP_RX_SN is set to an initial value (e.g., 0).

RX_HFN, which indicates a HFN value for the generation of a COUNT value used for a PDCP SDU received by the PDCP entity. At establishment of the PDCP entity, the RX_HFN is set to an initial value (e.g., 0).

In the following examples, a UE is used for representing the communication device 100 in FIG. 1, to simplify the illustration of the examples.

Figure 3:
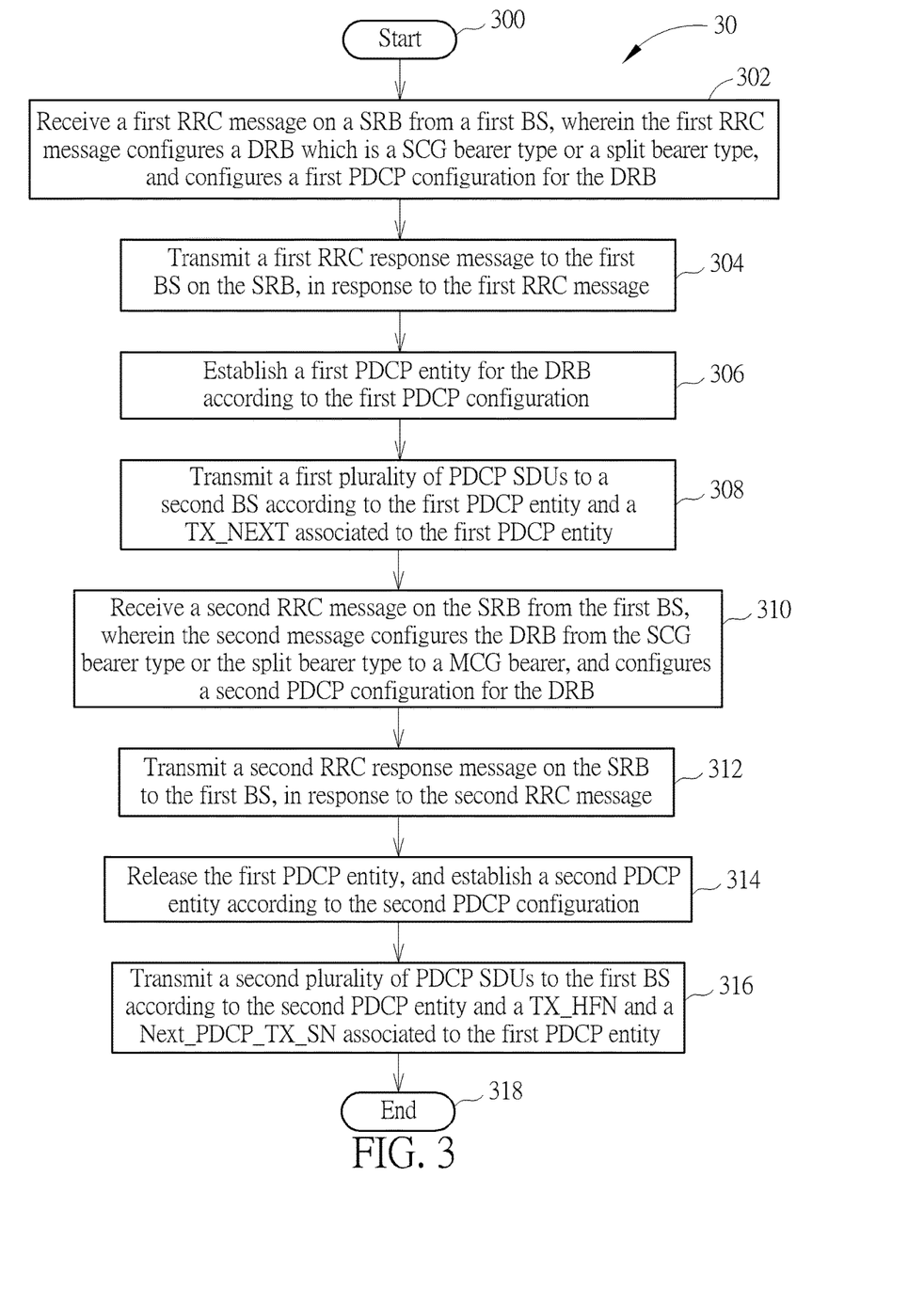
FIG. 3 is a flowchart of a process according to an example of the present invention.

A process 30 in FIG. 3 is utilized in a UE to handle a bearer type change, and includes the following steps:

Step 300: Start.

Step 302: Receive a first radio resource control (RRC) message on a SRB from a first BS, wherein the first RRC message configures a DRB which is a SCG bearer type or a split bearer type, and configures a first PDCP configuration for the DRB.

Step 304: Transmit a first RRC response message to the first BS on the SRB, in response to the first RRC message.

Step 306: Establish a first PDCP entity for the DRB according to the first PDCP configuration.

Step 308: Transmit a first plurality of PDCP Service Data Units (SDUs) to a second BS according to the first PDCP entity and a TX_NEXT associated to the first PDCP entity.

Step 310: Receive a second RRC message on the SRB from the first BS, wherein the second message configures the DRB from the SCG bearer type or the split bearer type to a MCG bearer, and configures a second PDCP configuration for the DRB.

Step 312: Transmit a second RRC response message on the SRB to the first BS, in response to the second RRC message.

Step 314: Release the first PDCP entity, and establish a second PDCP entity according to the second PDCP configuration.

Step 316: Transmit a second plurality of PDCP SDUs to the first BS according to the second PDCP entity and a TX_HFN and a Next_PDCP_TX_SN associated to the first PDCP entity.

Step 318: End.

Realization of the process 30 is not limited to the above description. The following examples may be applied to the process 30.

In one example, the steps 314 and 316 in the process 30 can be replaced by the steps 314a and 316a, respectively.

Step 314a: Reconfigure the first PDCP entity according to the second PDCP configuration.

Step 316a: Transmit a second plurality of PDCP SDUs to the second BS according to the first PDCP entity and a TX_HFN and a Next_PDCP_TX_SN associated to the first PDCP entity.

In one example, the UE releases the first PDCP entity in response to the second RRC message. In one example, the UE sets the TX_HFN and the Next_PDCP_TX_SN to initial values (e.g., 0) when establishing the second PDCP entity.

Figure 4:
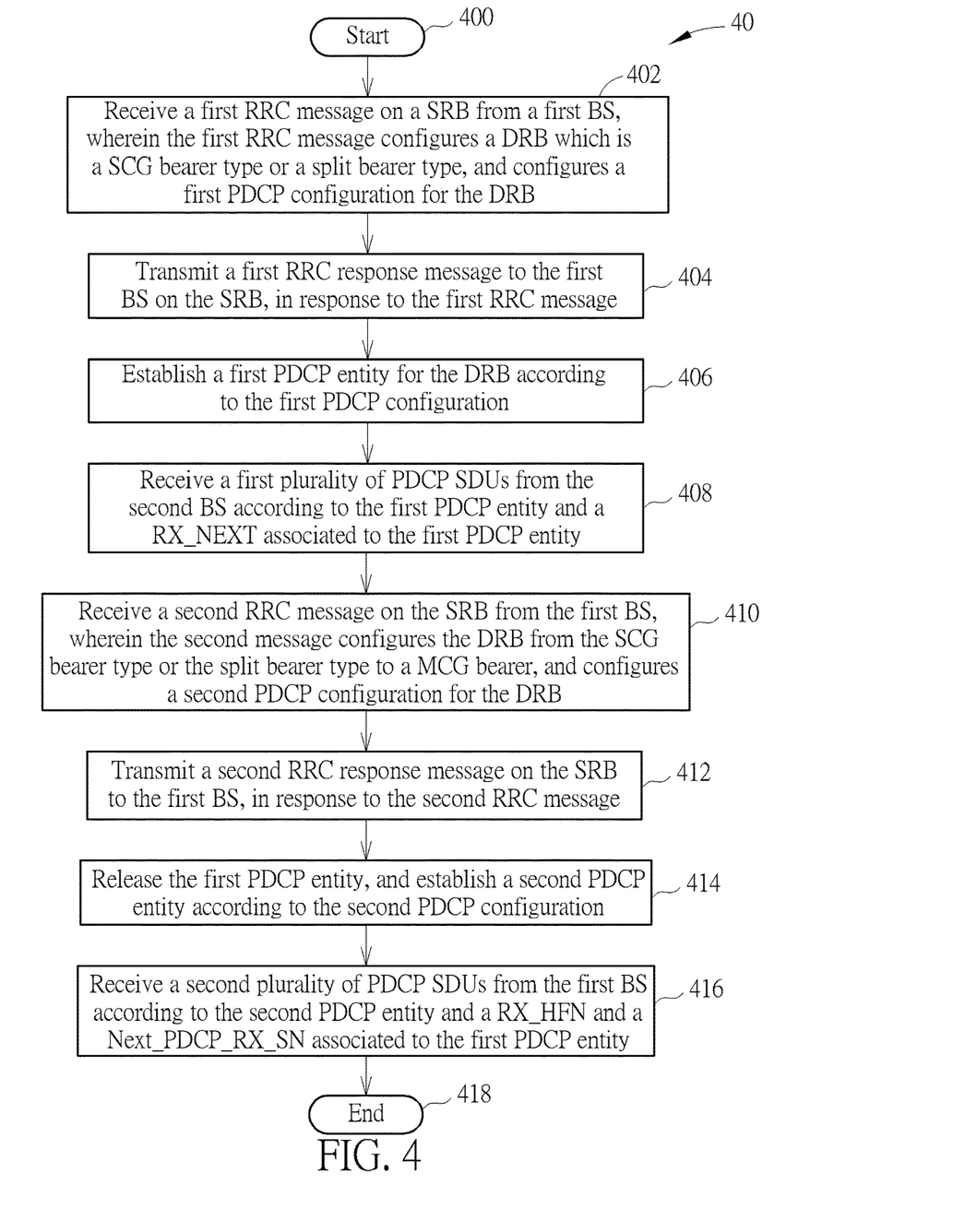
FIG. 4 is a flowchart of a process according to an example of the present invention.

A process 40 in FIG. 4 is utilized in a UE to handle a bearer type change, and includes the following steps:

Step 400: Start.

Steps 402-406: Same as the steps 302-306.

Step 408: Receive a first plurality of PDCP SDUs from the second BS according to the first PDCP entity and a RX_NEXT associated to the first PDCP entity.

Steps 410-414: Same as the steps 310-314.

Step 416: Receive a second plurality of PDCP SDUs from the first BS according to the second PDCP entity and a RX_HFN and a Next_PDCP_RX_SN associated to the first PDCP entity.

Step 418: End.

Realization of the process 40 is not limited to the above description. The following examples may be applied to the process 40.

In one example, the steps 414 and 416 in the process 40 can be replaced by the steps 414a and 416a, respectively.

Step 414a: Same as the step 314a.

Step 416a: Receive a second plurality of PDCP SDUs from the second BS according to the first PDCP entity and a RX_HFN and a Next_PDCP_RX_SN associated to the first PDCP entity.

In one example, the UE releases the first PDCP entity in response to the second RRC message. In one example, the UE sets the RX_HFN and the Next_PDCP_RX_SN to initial values (e.g., 0) when establishing the second PDCP entity.

Figure 5:
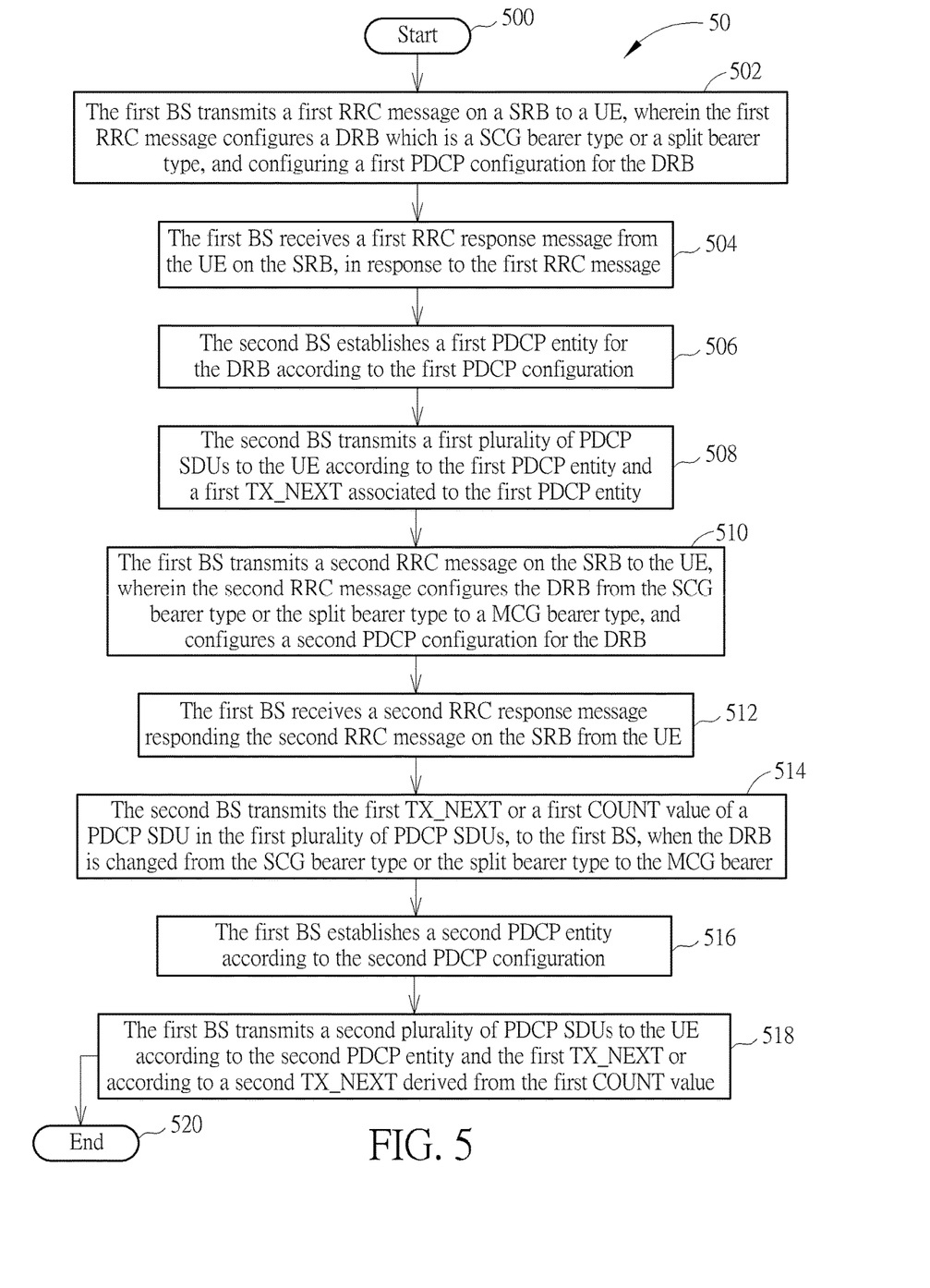
FIG. 5 is a flowchart of a process according to an example of the present invention.

A process 50 in FIG. 5 is utilized in a network comprising a first BS (e.g., the BS 102 in FIG. 1) of a first RAT and a second BS (e.g., the BS 104 in FIG. 1) of a second RAT to handle a bearer type change, and includes the following steps:

Step 500: Start.

Step 502: The first BS transmits a first RRC message on a SRB to a UE, wherein the first RRC message configures a DRB which is a SCG bearer type or a split bearer type, and configuring a first PDCP configuration for the DRB.

Step 504: The first BS receives a first RRC response message from the UE on the SRB, in response to the first RRC message.

Step 506: The second BS establishes a first PDCP entity for the DRB according to the first PDCP configuration.

Step 508: The second BS transmits a first plurality of PDCP SDUs to the UE according to the first PDCP entity and a first TX_NEXT associated to the first PDCP entity.

Step 510: The first BS transmits a second RRC message on the SRB to the UE, wherein the second RRC message configures the DRB from the SCG bearer type or the split bearer type to a MCG bearer type, and configures a second PDCP configuration for the DRB.

Step 512: The first BS receives a second RRC response message responding the second RRC message on the SRB from the UE.

Step 514: The first BS receives the first TX_NEXT (i.e., value) or a first COUNT value of a PDCP SDU in the first plurality of PDCP SDUs, to the first BS, when the DRB is changed from the SCG bearer type or the split bearer type to the MCG bearer.

Step 516: The first BS establishes a second PDCP entity according to the second PDCP configuration.

Step 518: The first BS transmits a second plurality of PDCP SDUs to the UE according to the second PDCP entity and the first TX_NEXT or according to a second TX_NEXT derived from the first COUNT value.

Step 520: End.

Realization of the process 50 is not limited to the above description. The following examples may be applied to the process 50.

In one example, the PDCP SDU (associated to the first COUNT value) of the first plurality of PDCP SDUs indicates that a successful transmission of a corresponding PDCP Protocol Data Unit (PDU) is not confirmed (e.g., has not been confirmed) by a lower layer of a PDCP in the second BS.

In one example, the first BS derives the second TX_NEXT by setting the second TX_NEXT to the first COUNT value.

In one example, the steps 514, 516 and 518 in the process 50 can be replaced by the steps 514a, 516a and 518a, respectively.

Step 514a: The second BS derives a PDCP_SN and a HFN from the first TX_NEXT or the first COUNT value, and transmits the PDCP_SN and the HFN to the first BS.

Step 516a: The first BS establishes a second PDCP entity according to the second PDCP configuration, and derives a second TX_NEXT from the PDCP_SN and the HFN.

Step 518a: The first BS transmits a second plurality of PDCP SDUs to the UE according to the second PDCP entity and the second TX_NEXT.

In one example, the second BS derives the PDCP SN and the HFN from the first TX_NEXT by setting the PDCP SN to a SN of the first TX_NEXT and setting the HFN to a HFN of the first TX_NEXT. The SN of the first TX_NEXT is the number of least significant bits (LSBs) equal to the second PDCP SN length in the first TX_NEXT. The HFN of the first TX_NEXT is the number of most significant bits (MSBs) equal to HFN length in the first TX_NEXT, wherein the HFN length=(length of the first TX_NEXT)−the second PDCP SN length.

In one example, the first TX_NEXT has 32 bits and the first PDCP configuration configures 12 bits as the first PDCP SN length for the first DRB. The second BS sets the PDCP SN to 12 LSBs of the TX_NEXT and sets the HFN to 20 MSBs of the TX_NEXT.

In one example, the first BS derives the second TX_NEXT from the PDCP SN and the HFN by setting the second TX_NEXT to a combination of HFN as MSBs of the second TX_NEXT and the PDCP SN as LSBs of the second TX_NEXT.

Figure 6:
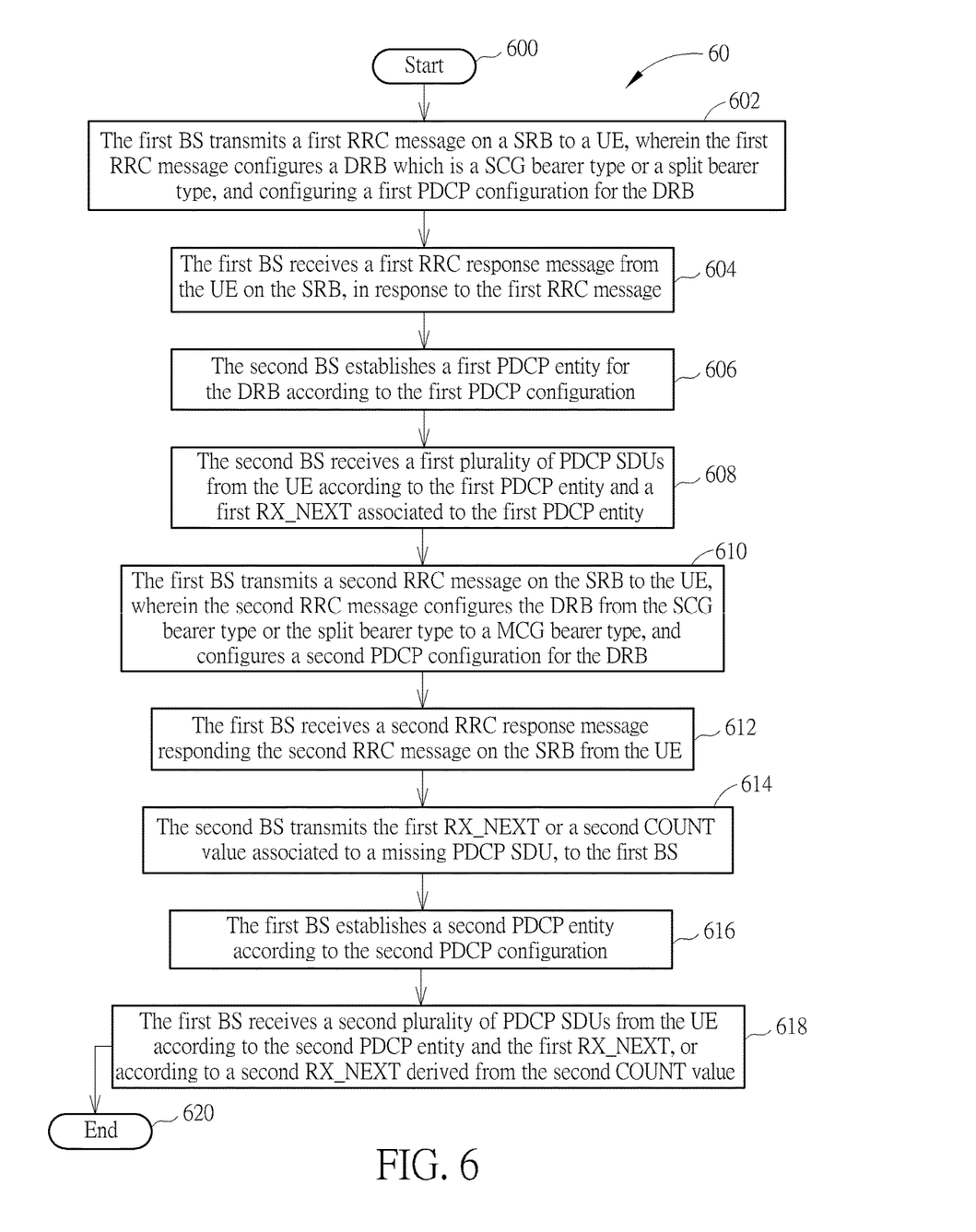
FIG. 6 is a flowchart of a process according to an example of the present invention.

A process 60 in FIG. 6 is utilized in a network comprising a first BS (e.g., the BS 102 in FIG. 1) of a first RAT and a second BS (e.g., the BS 104 in FIG. 1) of a second RAT to handle a bearer type change, and includes the following steps:

Step 600: Start.

Steps 602-606: Same as the steps 502-506.

Step 608: The second BS receives a first plurality of PDCP SDUs from the UE according to the first PDCP entity and a first RX_NEXT associated to the first PDCP entity.

Steps 610-612: Same as the steps 510-512.

Step 614: The second BS transmits the first RX_NEXT (i.e., value) or a second COUNT value associated to a missing PDCP SDU, to the first BS.

Step 616: The first BS establishes a second PDCP entity according to the second PDCP configuration.

Step 618: The first BS receives a second plurality of PDCP SDUs from the UE according to the second PDCP entity and the first RX_NEXT, or according to a second RX_NEXT derived from the second COUNT value.

Step 620: End.

Realization of the process 60 is not limited to the above description. The following examples may be applied to the process 60.

In one example, the first BS derives the second RX_NEXT by setting the second RX_NEXT to the second COUNT value.

In one example, the second BS transmits a bitmap indicating at least one other missing PDCP SDU which has at least one third COUNT values after the second COUNT value associated to the missing PDCP SDU (e.g., the first missing PDCP SDU), to the first BS. In one example, the first BS derives the second RX_NEXT by setting the second RX_NEXT to the second COUNT value associated to the missing PDCP SDU, wherein the first BS derives a COUNT value associated to the last missing PDCP SDU from the second COUNT value of the missing PDCP SDU and the bitmap. For example, when the last bit in the bitmap indicates missing (e.g., the last bit has value 0), the first BS sets the COUNT value associated to the last missing PDCP SDU to (the second COUNT value of the missing PDCP SDU+bit position of the last bit). That is, the second RX_NEXT=(the second COUNT value of the missing PDCP SDU+bit position of the last bit (e.g., the N-th bit)). For example, when the last bit in the bitmap indicates acknowledged or no need to be retransmitted (e.g., the last bit has value 1), the first BS sets the COUNT value associated to the last missing PDCP SDU to (the second COUNT value of the missing PDCP SDU+bit position of the last bit+1). That is, the second RX_NEXT=(the second COUNT value of the missing PDCP SDU+bit position of the last bit+1).

In one example, the steps 614, 616 and 618 in the process 60 can be replaced by the steps 614a, 616a and 618a, respectively.

Step 614a: The second BS derives a PDCP SN and a HFN from the first RX_NEXT or the second COUNT value associated to a missing PDCP SDU, and transmits the PDCP SN and the HFN to the first BS.

Step 616a: The first BS establishes a second PDCP entity according to the second PDCP configuration, and derives a second RX_NEXT from the PDCP SN and the HFN.

Step 618a: The first BS receives a second plurality of PDCP SDUs from the UE according to the second PDCP entity and the second RX_NEXT.

In one example, the second BS derives the PDCP SN and the HFN above from the first RX_NEXT by setting the PDCP SN to SN of the first RX_NEXT and setting the HFN to a HFN of the first RX_NEXT. The SN of the first RX_NEXT includes the number of least significant bits (LSBs) in the first RX_NEXT. The number of LSBs equals to a PDCP SN length configured in the first PDCP configuration. The HFN of the first RX_NEXT includes the number of most significant bits (MSBs) in the first RX_NEXT. The number of MSBs equals to a HFN length in the first RX_NEXT, wherein the HFN length=(length of the first RX_NEXT)−the PDCP SN length.

In one example, the second BS derives the PDCP SN and the HFN from the second COUNT value of the missing PDCP SDU (e.g., the first PDCP SDU) by setting the PDCP SN to a SN of the second COUNT value and setting the RX_HFN to a HFN of the second COUNT value. The SN of the second COUNT value includes the number of LSBs in the second COUNT value. The number of LSBs equals to the PDCP SN length configured in the first PDCP configuration. The HFN of the second COUNT value includes the number of MSBs in the second COUNT value. The number of MSBs equals to a HFN length in the second COUNT value, wherein the HFN length=(length of the second COUNT value)−the PDCP SN length.

In one example, the first RX_NEXT (or the second COUNT value associated to the missing PDCP SDU) has 32 bits and the first PDCP configuration configures 12 bits as the PDCP SN length for the first DRB. The second BS sets the PDCP SN to 12 LSBs of the first RX_NEXT (or the second COUNT value) and sets the HFN to 20 MSBs of the first RX_NEXT (or the second COUNT value).

In one example, the second BS detects (or determines) the missing PDCP SDU from the first plurality of PDCP SDUs. For example, the first plurality of PDCP SDUs has the first PDCP SDU and the second PDCP SDU. A SN of the first PDCP SDU is M and a SN of the second PDCP SDU is N (N>M). Then, the UE detects (or determines) the missing PDCP SDU which is a PDCP SDU with a PDCP SN=M+1, M+2, . . . or N−1 since the first BS does not receive the PDCP SDU.

In one example, the second BS transmits a bitmap indicating at least one other missing PDCP SDU which has at least one PDCP SN after the PDCP SN of the missing PDCP SDU, to the first BS. In one example, the second BS transmits a bitmap indicating at least one other PDCP SDUs which has at least one COUNT value after the second COUNT value of the missing PDCP SDU, to the first BS.

In one example, the first BS derives the second RX_NEXT from the PDCP SN and the HFN by setting the second RX_NEXT to a combination of HFN as MSBs of the second RX_NEXT and the PDCP SN as LSBs of the second RX_NEXT.

In one example, the first BS derives the second RX_NEXT from the PDCP SN, the HFN and the bitmap. For example, when the last bit in the bitmap indicates missing (e.g., the last bit has value 0), the first BS sets the second RX_NEXT=((a combination of HFN as MSBs of the second RX_NEXT and the PDCP SN as LSBs of the second RX_NEXT)+bit position of the last bit). For example, when the last bit in the bitmap indicates acknowledged or no need to be retransmitted (e.g., the last bit has value 1), the first BS sets the second RX_NEXT=((a combination of the HFN as MSBs of the second RX_NEXT and the PDCP SN as LSBs of the second RX_NEXT)+bit position of the last bit+1).

In one example, the first BS derives a RX_DELIV from the PDCP SN and the HFN by setting the RX_DELIV to (a combination of the HFN as MSBs of the RX_DELIV and the PDCP SN as LSBs of the RX_DELIV). For example, the HFN has 20 bits and the PDCP SN has 12 bits. The RX_DELIV is 32 bits=20 bits of the HFN as the MSBs of the RX_DELIV and 12 bits of (the PDCP SN) of the RX_DELIV.

Figure 7:
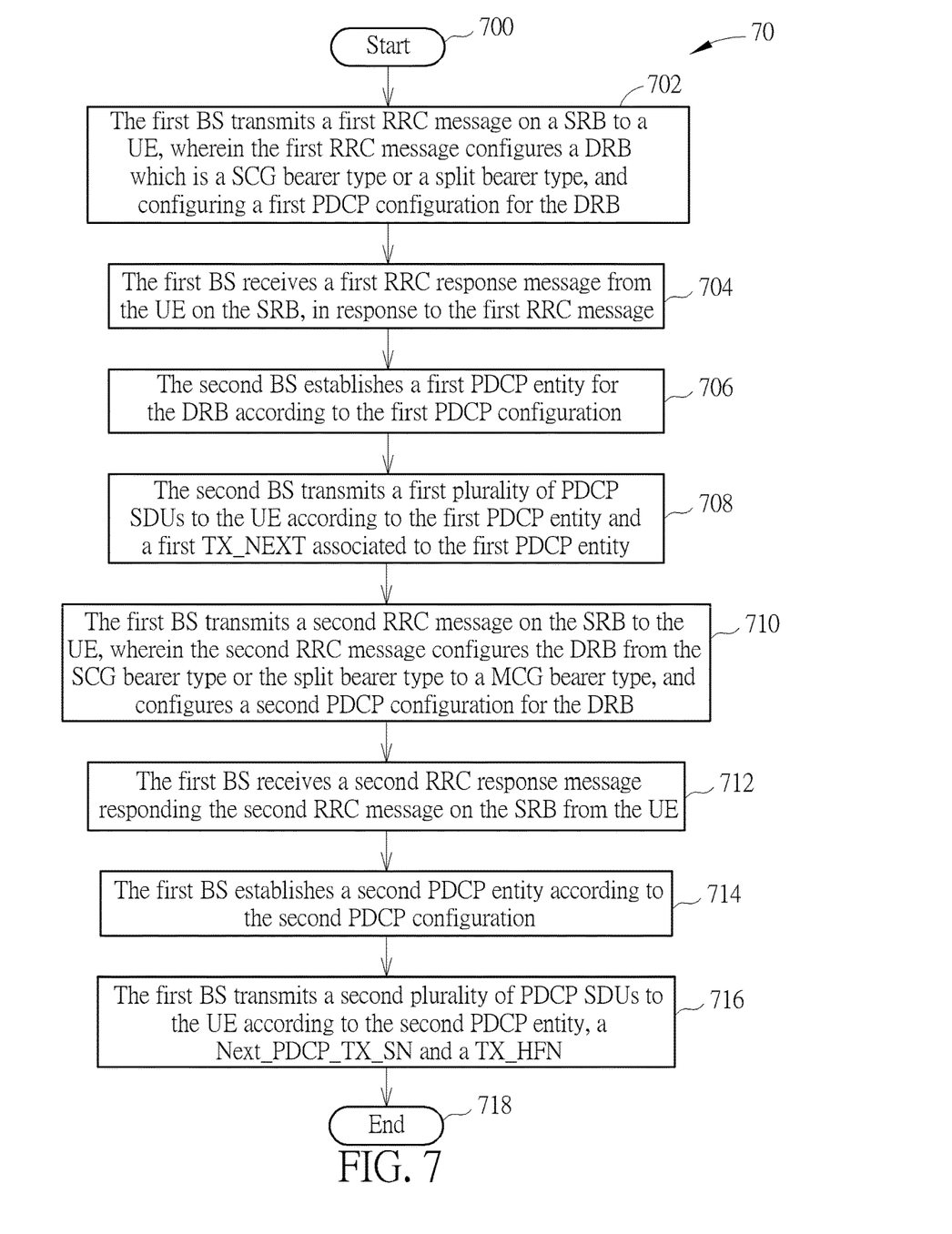
FIG. 7 is a flowchart of a process according to an example of the present invention.

A process 70 in FIG. 7 is utilized in a network comprising a first BS (e.g., the BS 102 in FIG. 1) of a first RAT and a second BS (e.g., the BS 104 in FIG. 1) of a second RAT to handle a bearer type change, and includes the following steps:

Step 700: Start.

Steps 702-712: Same as the steps 502-512.

Step 714: The first BS establishes a second PDCP entity according to the second PDCP configuration.

Step 716: The first BS transmits a second plurality of PDCP SDUs to the UE according to the second PDCP entity, a Next_PDCP_TX_SN and a TX_HFN.

Step 718: End.

In one example, the first BS sets the TX_HFN and the Next_PDCP_TX_SN to initial values (e.g., 0) when establishing the second PDCP entity.

In one example, the second BS receives a first plurality of PDCP SDUs from the UE according to the first PDCP entity and a first RX_NEXT associated to the first PDCP entity. The first BS receives a second plurality of PDCP SDUs from the UE according to the second PDCP entity, a RX_HFN and a Next_PDCP_RX_SN. In one example, the first BS sets the RX_HFN and the Next_PDCP_RX_SN to initial values (e.g. 0) when establishing the second PDCP entity.

Examples and description for the process 30-60 may be applied to process 70 and are not repeated herein.

The following examples can be applied to the processes 30-70.

In one example, the first PDCP configuration comprises (or configures) a first PDCP SN length. The UE uses the first PDCP SN length to transmit the first plurality of PDCP SDUs. That is, for transmitting each of the first plurality of PDCP SDUs, the UE generates a PDCP Data PDU including a PDCP SN of the first PDCP SN length and the PDCP SDU which is compressed, integrity protected or ciphered. In one example, the second PDCP configuration comprises a second PDCP SN length. The second PDCP SN length is the same as or different from the first PDCP SN length. Alternatively, the second PDCP configuration does not include the second PDCP SN length, which implies that the second PDCP configuration configures the second PDCP SN length to the first PDCP SN length. For transmitting each of the second plurality of PDCP SDUs, the UE generates a PDCP Data PDU including a PDCP SN of the second PDCP SN length and the PDCP SDU which is compressed, integrity protected or ciphered.

In one example, the first PDCP configuration may belong to the first RAT or the second RAT. The second PDCP configuration may belong to the first RAT or the second RAT.

In one example, the first RAT is an evolved universal terrestrial radio access (E-UTRA), and the second RAT is a new radio (NR). The first BS is a master evolved Node-B (MeNB), and the second BS is a SgNB. The split bearer is a MCG split bearer or a SCG split bearer.

It should be noted that although the examples above are described to clarify the related operations of corresponding processes, the examples can be combined or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling a bearer type change. The UE still transmits other PDCP SDUs according to the first TX_NEXT when the bearer type of the radio bearer is changed. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a bearer type change, comprising:
   at least one storage device; and
   at least one processing circuit, coupled to the at least one storage device, wherein the at least one storage device stores, and the at least one processing circuit is configured to execute instructions of:
   receiving a first radio resource control (RRC) message on a signaling radio bearer (SRB) from a first base station (BS), wherein the first RRC message configures a data radio bearer (DRB) which is a secondary cell group (SCG) bearer type or a split bearer type, and configures a first packet data convergence protocol (PDCP) configuration for the DRB;
   transmitting a first RRC response message to the first BS on the SRB, in response to the first RRC message;
   establishing a first PDCP entity for the DRB according to the first PDCP configuration;
   transmitting a first plurality of PDCP Service Data Units (SDUs) to a second BS according to the PDCP entity and a TX_NEXT associated to the PDCP entity;
   receiving a second RRC message on the SRB from the first BS, wherein the second message configures the DRB from the SCG bearer type or the split bearer type to a master cell group (MCG) bearer type, and configures a second PDCP configuration for the DRB;
   transmitting a second RRC response message on the SRB to the first BS, in response to the second RRC message;
   releasing the first PDCP entity, and establishing a second PDCP entity according to the second PDCP configuration; and
   transmitting a second plurality of PDCP SDUs to the first BS according to the second PDCP entity and a TX_HFN and a Next_PDCP_TX_SN associated to the second PDCP entity.

2. The communication device of claim 1, wherein the instructions further comprise:
   receiving a third plurality of PDCP SDUs from the second BS according to the first PDCP entity and a first RX_NEXT associated to the PDCP entity; and
   receiving a fourth plurality of PDCP SDUs from the first BS according to the second PDCP entity and a RX_HDN and a Next_PDCP_RX_SN associated to the second PDCP entity.

3. The communication device of claim 1, wherein the first BS is a master evolved Node-B (MeNB), and the second BS is a secondary next-generation Node-B (SgNB).

4. A network comprising a first base station (BS) of a first radio access technology (RAT) and a second BS of a second RAT, for handling a bearer type change, comprising:
   at least one storage device; and
   at least one processing circuit, coupled to the at least one storage device, wherein the at least one storage device stores, and the at least one processing circuit is configured to execute instructions of:
   the first BS transmitting a first radio resource control (RRC) message on a signaling radio bearer (SRB) to a communication device, wherein the first RRC message configures a data radio bearer (DRB) which is a secondary cell group (SCG) bearer type or a split bearer type, and configuring a first packet data convergence protocol (PDCP) configuration for the DRB;
   the first BS receiving a first RRC response message from the communication device on the SRB, in response to the first RRC message;
   the second BS establishing a first PDCP entity for the DRB according to the first PDCP configuration;
   the second BS transmitting a first plurality of PDCP Service Data Units (SDUs) to the communication device according to the first PDCP entity and a first TX_NEXT associated to the first PDCP entity;
   the first BS transmitting a second RRC message on the SRB to the communication device, wherein the second RRC message configures the DRB from the SCG bearer type or the split bearer type to a master cell group (MCG) bearer type, and configures a second PDCP configuration for the DRB;

the first BS receiving a second RRC response message responding the second RRC message on the SRB from the communication device;

the second BS transmitting the first TX_NEXT or a first COUNT value of a PDCP SDU in the first plurality of PDCP SDUs, to the first BS, when the DRB is changed from the SCG bearer type or the split bearer type to the MCG bearer;

the first BS establishing a second PDCP entity according to the second PDCP configuration; and the first BS transmitting a second plurality of PDCP SDUs to the communication device according to the second PDCP entity and the first TX_NEXT or according to a second TX_NEXT derived from the first COUNT value.

5. The network of claim 4, wherein the PDCP SDU of the first plurality of PDCP SDUs indicates that a successful transmission of a corresponding PDCP Protocol Data Unit (PDU) is not confirmed by a lower layer of a PDCP in the second BS.

6. The network of claim 4, wherein the first BS derives the second TX_NEXT by setting the second TX_NEXT to the first COUNT value.

7. The network of claim 4, wherein the instructions further comprise:
the second BS receiving a third plurality of PDCP SDUs from the communication device according to the first PDCP entity and a first RX_NEXT associated to the first PDCP entity;

the second BS transmitting the first RX_NEXT or a second COUNT value associated to a missing PDCP SDU, to the first BS; and the first BS receiving a fourth plurality of PDCP SDUs from the communication device according to the second PDCP entity and the first RX_NEXT, or according to a second RX_NEXT derived from the second COUNT value.

8. The network of claim 7, wherein the first BS derives the second RX_NEXT by setting the second RX_NEXT to the second COUNT value.

9. A network comprising a first base station (BS) of a first radio access technology (RAT) and a second BS of a second RAT, for handling a bearer type change, comprising:
at least one storage device; and
at least one processing circuit, coupled to the at least one storage device, wherein the at least one storage device stores, and the at least one processing circuit is configured to execute instructions of:

the first BS transmitting a first radio resource control (RRC) message on a signaling radio bearer (SRB) to a communication device, wherein the first RRC message configures a data radio bearer (DRB) which is a secondary cell group (SCG) bearer type or a split bearer type, and configuring a first packet data convergence protocol (PDCP) configuration for the DRB;

the first BS receiving a first RRC response message from the communication device on the SRB, in response to the first RRC message;

the second BS establishing a first PDCP entity for the DRB according to the first PDCP configuration;

the second BS transmitting a first plurality of PDCP Service Data Units (SDUs) to the communication device according to the first PDCP entity and a TX_NEXT associated to the first PDCP entity;

the first BS transmitting a second RRC message on the SRB to the communication device, wherein the second RRC message configures the DRB from the SCG bearer type or the split bearer type to a master cell group (MCG) bearer type, and configures a second PDCP configuration for the DRB;

the first BS receiving a second RRC response message responding the second RRC message on the SRB from the communication device;

the first BS establishing a second PDCP entity according to the second PDCP configuration; and the first BS transmitting a second plurality of PDCP SDUs to the communication device according to the second PDCP entity, a Next_PDCP_TX_SN and a TX_HFN.

10. The network of claim 9, wherein the instructions further comprise:
the second BS receiving a third plurality of PDCP SDUs from the communication device according to the first PDCP entity and a RX_NEXT associated to the first PDCP entity;

the second BS transmitting the RX_NEXT or a second COUNT value associated to a missing PDCP SDU, to the first BS;

the first BS receiving a fourth plurality of PDCP SDUs from the communication device according to the second PDCP entity, a RX_HFN and a Next_PDCP_RX_SN.

* * * * *